3,137,700
PROCESS FOR THE PREPARATION OF
GLUTARIMIDE COMPOUNDS
Francis Johnson, Newton Lower Falls, Mass., assignor to
The Dow Chemical Company, Midland, Mich., a corporation of Delaware
No Drawing. Filed Nov. 1, 1961, Ser. No. 149,172
2 Claims. (Cl. 260—281)

This invention relates to a process for the preparation of 3-carboxymethylglutarimide compounds.

It is an object of this invention to provide a process for preparing 3-carboxymethylglutarimide compounds. It is also an object of this invention to provide novel 3-carboxymethylglutarimide compounds.

I discovered that 3-carboxymethylglutarimide compounds corresponding to the following

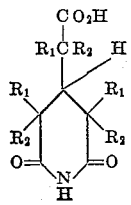

wherein groups designated by $R_1$, $R_2$ are selected from the class consisting of hydrogen and lower alkyl, lower alkoxyl, aryl, and phenoxyl groups such as methyl, butyl, octyl, phenyl, benzyl, ethoxyl, phenoxyl, etc., are prepared by cyclizing the corresponding 3-cyanomethylglutarate in the presence of an acid. The 3-cyanomethylglutarates useful as the raw materials in the preparation of the corresponding glutarimide are broadly represented by Formula I. Those represented by Formula II are preferred.

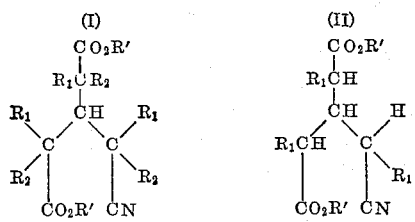

where R' is hydrogen or a salt or simple ester forming moiety such as potassium, sodium, lithium, butyl, octyl, and preferably is lower alkyl, such as methyl or ethyl. The preparation of the 3-cyanomethylglutarates is described in my copending application filed of even date herewith, entitled "Process for the Preparation of Cyanomethylglutaconate and Cyanomethylglutarate Compounds," Serial No. 149,200, which is by this reference incorporated herein.

The cyclization of the glutarate requires relatively rigorous conditions in an aqueous acidic solution. I prefer hydrochloric acid or hydrobromic acid. The cyclization of the 3-cyanomethylglutarate takes place in the aqueous acidic solution which is heated to a temperature between room temperature and reflux temperature of the system until all the acid halide has been driven off. The cyclization occurs at temperatures between 150° C. and 350° C. Although the system may be heated initially at lower temperatures, the system must be heated to temperatures above 150° C. to complete the reaction.

To give those skilled in the art a better understanding of the invention, the following illustrative examples are given:

*Example 1*

Dimethyl 3-cyanomethylglutarate (100 g.) and hydrochloric acid (300 ml.; 30%) were refluxed gently for 18 hrs. Excess hydrochloric acid and water were removed insofar as was possible under reduced pressure on a steam bath using water pump vacuum. The almost white residual slush was then slowly heated to 235° in an oil bath. This temperature was maintained for approximately 2 hrs. until no further gas evolution occurred and the liquid had become clear and quiescent. The yellow-brown melt crystallized completely on cooling to room temperature. The crude product was dissolved in dioxane (500 ml.), the solution refluxed briefly with charcoal and filtered. The filtrate was concentrated to 150 ml. and hot ethyl acetate (200 ml.) added. Crystals of 3-carboxymethylglutarimide began to deposit almost immediately. When crystallization was complete the faintly brown crystalline product (80 g.) was removed by filtration (yield 93%). The product was suitable for most subsequent synthetic work. In this case, the product was further purified in the following way. The total material was dissolved in hot alcohol (600 ml.) containing water 50 ml.) and the liquid boiled briefly with charcoal, filtered and concentrated to 400 ml. On cooling, a crop of colorless crystals were deposited (68 g.) having a M.P. of 176–178°. Further processing with the mother liquors yielded an additional 3.2 grams having the same melting point as the main crop. A mixed melting point of the product obtained from this reaction with a known sample of 3-carboxymethylglutarimide did not show any depression. In addition, the infrared spectrum of the material prepared in this way was identical with that of 3-carboxymethylglutarimide.

*Example 2*

Following the procedure of Example 1, dibutyl 3-cyanomethylglutarate is used in place of dimethyl-3-cyanomethylglutarate, to yield 3-carboxymethylglutarimide.

*Example 3*

Following the procedure of Example 1, diethyl 2,4-diethyl-3-(1-cyanopropyl) glutarate is used in place of dimethyl 3-cyanomethylglutarate, to yield 2,4-diethyl-3-(1-carboxypropyl) glutarimide.

*Example 4*

Following the procedure of Example 1, dimethyl 2,4-dimethyl-3-(1-cyanoethyl) glutarate is used in place of dimethyl 3-cyanomethylglutarate to yield 2,4-dimethyl-3-(1-carboxyethyl) glutarimide.

Similarly, other 3-carboxymethylglutarimides are prepared from 3-cyanomethylglutarates containing various R substituents in the positions noted hereinbefore. The size of the R groups should not be such as to interfere with the cyclization reaction. These glutarimide compounds in a variety of substituted forms are useful for the preparation of polymers. The 3-carboxymethylglutarimide compounds are also biologically active. They are most important as intermediates in the preparation of cyclohex-imides and related compounds.

Although the invention has been described in connection with specific embodiments, it is to be understood that the invention includes all modifications and variations that come within the scope of the appended claims.

What is claimed is:

1. The process for preparing 3-carboxymethylglutarimide comprising heating, to a temperature in excess of 150° C. in an acidic aqueous solution, a 3-cyanomethylglutarate having the formula

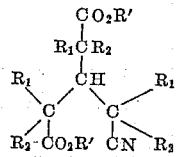

wherein R' is selected from the group consisting of an alkali metal, and lower alkyls, and the numbered R groups are selected from the class consisting of hydrogen and lower alkyls.

2. The process for preparing 3-carboxymethylglutarimide comprising heating, to a temperature in excess of 150° C. in an acidic aqueous solution a 3-cyanomethylglutarate having the formula

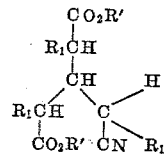

wherein R' is selected from the group consisting of an alkali metal, and lower alkyls, and the numbered R groups are selected from the class consisting of hydrogen and lower alkyls.

References Cited in the file of this patent

Phillips et al.: Jour. Amer. Chem. Soc., vol. 79, pp. 3517–19 (1957).